Patented Apr. 16, 1946

2,398,669

UNITED STATES PATENT OFFICE 2,398,669

MODIFIED ROSIN ESTERS AND THE PROCESS OF MAKING SAME

John B. Rust, West Orange, N. J., assignor to Montclair Research Corporation, a corporation of New Jersey No Drawing. Application May 6, 1944, Serial No. 534,531

18 Claims. (Cl. 260—27)

The present invention relates to modified rosin esters which are particularly adapted to the formulation of coating compositions.

It is an object of this invention to provide modified rosin esters which vary in hardness from brittle products to soft, tough, rubbery resins which are compatible with nitrocellulose, soluble in drying oils and which may be made heat-convertible on proper formulation.

It is a further object of this invention to provide modified natural resins which accelerate the bodying of drying oils.

Another object of this invention is to make low-melting, heat-convertible resins which may be used as plasticizing components of nitrocellulose lacquers.

Another object of this invention is to make substantially neutral heat-hardenable derivatives of rosin esters.

Still further objects and advantages of the present invention will be obvious from the more detailed description set forth below, it being understood that this description is given by way of illustration and explanation only, and not of limitation, since various changes therein may be made by those skilled in the art without departing from the scope and spirit of the invention.

In my copending application Serial No. 531,117, filed April 14, 1944, I have described and claimed coreaction products of rosin esters with unsaturated alcohol esters of alpha unsaturated alpha-beta dicarboxylic acids. I have now found, and this is the subject of the present invention, that rosin esters can be reacted with unsaturated alcohol esters of saturated polycarboxylic acids to yield resinous reaction products which in general are softer than the resins obtained from the esters of unsaturated acids but are more soluble in drying oils and also are oil-reactive. Like the resins from the esters of unsaturated acids, the products are hydrolyzable by saponification to rosin compounds which probably are hydroxy acids, since the acid number of the water-insoluble hydrolytic products is lowered by heating.

The process of the present invention comprises reacting the rosin or abietic acid esters of glycerol, pentaerythritol, mannitol, glycol, trihydroxymethylamino-methane and the like, with an unsaturated alcohol ester of a saturated aliphatic or aromatic polycarboxylic acid such as diallyl phthalate, monoallyl phthalate, dimethallyl phthalate, monomethallyl phthalate, dicrotyl phthalate, monocrotyl phthalate, dipropargyl phthalate, monopropargyl phthalate, dibutenyl phthalate, monobutenyl phthalate and the like, or the above alcohol esters of oxalic, malonic, methylmalonic, succinic, methyl succinic, dimethyl succinic, tartaric, citric, glutamic, adipic, pimelic, suberic, azelaic, sebacic acid and the like. By the term "saturated" is meant freedom from olefinic double bonds and not freedom from such double bonds as may be found in an aromatic nucleus.

It has been found possible to coreact a rosin ester and a diallyl ester at relatively low temperatures of about 200°–250° C. until a preliminary reaction is over. The rosin ester may be the rosin or abietic acid ester of any alcohol, monohydric or polyhydric and including mixed esters such as rosin phthalic glyceride; however, for the purposes of the present invention the ester is one which still retains the conjugated unsaturation of abietic acid. The preliminary reaction appears to be in the form of a partial reaction of the rosin ester and the allyl ester, followed by copolymerization of the preliminary reaction product with part of the allyl ester. After the preliminary reaction is over the temperature is raised to 275°–300° C. in order to convert the modified rosin ester to the desired softening point.

I may use the allyl ester in any proportion most suitable to bring about the desired degree of modification of the rosin ester to produce products which are completely soluble in lacquer solvents and also in drying oils. From 25% to 50% of the allyl saturated polycarboxylic acid ester will serve to bring about the desired degree of modification, although it is to be understood that these proportions may be varied over a considerably wider range. For instance, when the modified rosin ester contains less than 25% of the allyl ester, harder, more brittle products are obtained, and when 75% or more of the allyl ester is used, modified products are obtained which are tough, rubbery, and not brittle, and which are soluble in solvents but insoluble in drying oils.

In another embodiment of the present invention a monoallyl ester such as monoallyl phthalate, is heated with a rosin ester such as glyceryl diabietate, or any other polyhydric alcohol ester formed from an excess of polyhydric alcohol, to give the interester, interreaction product. In this way, a substantially neutral interesterified product may be made which contains less unsaturated alcohol than does the di-unsaturated alcohol ester-modified rosin ester. In some cases the latter procedure is preferred since only a monounsaturated alcohol ester is employed. Such monounsaturated alcohol esters are easily prepared by mixing molecularly equivalent amounts of unsaturated alcohol and saturated polycarboxylic acid anhydride and heating for a short time to obtain the acid ester.

I have also found that it is possible to copolymerize the products of the present invention with polymerizable compounds such as styrene, methyl methacrylate, ethyl acrylate, vinyl acetate, indene, and the like. Thus I may first carry out the preliminary reaction between the rosin ester and the diallyl ester, and then copolymerize with, for instance, vinyl acetate. Such copolymer resins are most useful in drying oil varnishes and in nitrocellulose lacquers.

The resins of the present invention are preferably made without polymerization catalysts. However, the use of catalysts speeds up the initial reaction and also assists in completing the final polymerization.

The modified resins of the present invention may be put to a variety of uses as for instance in formulations of lacquers with nitrocellulose, varnishes with drying oils, etc. It is a particular object of this invention to produce oil-reactive, heat-advancing resins by the modification of rosin ester with unsaturated alcohol esters, capable of continued polymerization when they are heated with drying oils in the usual practice of making varnishes. The resins of the present invention may also be blended with other resins such as urea-formaldehyde resins, phenol-aldehyde resins, melamine-formaldehyde resins, vinyl resins, methyl methacrylate, vinylidene dichloride, acrylate resins, cellulose derivatives, polyvinyl alcohol, and the like.

The following examples are given to illustrate the process and products of the present invention. All proportions are in parts by weight.

*Example 1.*—150 parts of glyceryl triabietate and 50 parts of diallyl phthalate are heated together to 200° C. in a reactor equipped with an agitator, thermometer and condenser and thereafter heated as follows:

200° C. to 240° C. for 2 hours
240° C. to 280° C. for 2 hours
280° C. to 300° C. for 3 hours A light-colored, hard, brittle resin was obtained which possessed an acid number of 29.3 and a softening point of 114° C. This resin was soluble in drying oils and completely compatible with nitrocellulose.

The resin was also used in a lacquer of the following formula:

|  | Per cent |
|---|---|
| Nitrocellulose | 8.33 |
| Resin | 25 |
| Xylol | 15 |
| Butyl acetate | 30 |
| Amyl acetate | 16.67 |
| Ethyl acetate | 2.50 |
| Octyl alcohol | 2.50 |

The lacquer gave a clear film which after drying for 1 hour showed a Sward hardness of 15 and after 48 hours, 45. Ester gum used in the same formula showed a Sward hardness after 1 hour of 7 and after 48 hours, 40.

Allyl ester-modified ester gum resins such as the above are soluble in esters, ketones, hydrocarbons, chlorinated hydrocarbons, nitropropane, glycol ether, and alcohols such as n-butanol; but insoluble in ethyl alcohol and ethylene glycol.

The resin of Example 1 was completely saponified by heating with concentrated sodium hydroxide solution and the solution of the saponified material was acidified with acetic acid. The precipitate was washed with water, filtered and dried. The acid number was 152. On heating for 1½ hours at 250° C. the acid number was 34.

*Example 2.*—75 parts of glyceryl triabietate and 75 parts of diallyl phthalate are heated together to 200° C. and thereafter heated as follows:

200° C. to 240° C. for 4 hours
240° C. to 280° C. for 6 hours

An extremely light-colored, hard, brittle resin was obtained which possessed an acid number of 25.4 and a softening point of 79° C. This resin was soluble in drying oils and compatible with nitrocellulose.

*Example 3.*—105 parts pentaerythrityl tetraabietate and 45 parts of diallyl phthalate were heated together to 200° C. and then heated further as follows:

200° C. to 250° C. for 4 hours
250° C. to 280° C. for 3 hours

An extremely light-colored, hard, brittle resin was obtained having an acid number of 21.3 and a softening point of 108° C.

*Example 4.*—105 parts of pentaerythrityl tetraabietate and 45 parts of diallyl succinate were heated together to 200° C. during 1 hour and then heated as follows:

200° C. to 250° C. for 4 hours
250° C. to 300° C. for 6 hours

A light-colored, hard, brittle resin was obtained having an acid number of 31.4 and a softening point of 97° C.

*Example 5.*—105 parts of glyceryl triabietate and 45 parts of diallyl oxalate were heated together to 200° C. during 1 hour and then heated as follows:

200° C. to 250° C. for 5 hours
250° C. to 300° C. for 6 hours

A fair colored, brittle resin was obtained having an acid number of 11.2 and a softening point of 112° C.

*Example 6.*—105 parts of glyceryl triabietate and 45 parts of diallyl adipate were heated together to 200° C. and then further heated as follows:

200° C. to 250° C. for 3 hours
250° C. to 280° C. for 14 hours

A light-colored, brittle resin was obtained having an acid number of 27.1 and a softening point of 58° C.

*Example 7.*—105 parts of glyceryl triabietate and 45 parts of diallyl succinate were heated together to 200° C. during 2 hours and then heated as follows:

200° C. to 250° C. for 4 hours
250° C. to 280° C. for 3 hours

A light-colored, brittle resin was obtained possessing an acid number of 25 and a softening point of 60° C.

*Example 8.*—131.2 parts of glyceryl diabietate and 41.2 parts of monoallyl phthalate were heated together to 200° C. and further heated as follows:

200° C. to 240° C. for 3 hours
240° C. to 280° C. for 4 hours

A hard, brittle, fair colored resin was obtained which possessed an acid number of 29.1 and a softening point of 121° C.

*Example 9.*—196.4 parts of pentaerythrityl triabietate and 44 parts of monomethallyl phthalate were heated together to 200° C. during an hour and then the temperature was increased as follows:

200° C. to 240° C. for 3 hours
240° C. to 280° C. for 4 hours

A hard, brittle, fair colored resin was obtained which possessed a softening point of 126° C. and an acid number of 24.2.

*Example 10.*—164.6 parts of trihydroxymethyl-aminomethane triabietate and 31.6 parts of monomethallyl succinate were heated to 200° C. and then as follows:

200° C. to 240° C. for 4 hours
240° C. to 260° C. for 6 hours

A fair colored, hard, brittle resin was obtained which possessed an acid number of 17.4 and a softening point of 131° C.

The products of the present invention consist of soluble resinous interreaction products of a rosin or abietic ester, preferably a polyhydric alcohol and an unsaturated alcohol-saturated aromatic or aliphatic polycarboxylic acid ester. This process, therefore, is one of bringing together a rosin ester and one or more of the above mentioned allyl esters under conditions of temperature such that a preliminary reaction product is initially secured, followed by further heating at 200°–300° C. to cause polymerization of the preliminary product to such a degree that soluble resinous products are obtained which find utility in nitrocellulose lacquers and drying oil varnishes.

I claim:

1. The process of making a soluble resinous reaction product which comprises heating, at between 200° C. and 300° C., an abietic acid ester and an allyl ester of a saturated polycarboxylic acid miscible therewith.

2. The process of making a soluble resinous reaction product which comprises heating, at between 200° C. and 300° C. a rosin-polyhydric alcohol ester and an allyl ester of a saturated dicarboxylic acid.

3. The process of making a soluble resinous reaction product which comprises heating together at between 200° C. and 300° C. a rosin polyhydric alcohol ester, formed from equivalent amounts of rosin acids and polyhydric alcohol, and a diallyl ester of a saturated dicarboxylic acid.

4. The process of making a soluble, substantially neutral resinous reaction product which comprises heating at between 200° C. and 300° C. a rosin-polyhydric alcohol ester formed from an excess of polyhydric alcohol, and a monoallyl alcohol ester of a saturated dicarboxylic acid.

5. The process of claim 3 where the allyl ester is diallyl phthalate.

6. The process of claim 3 where the allyl ester is diallyl succinate.

7. The process of claim 4 where the allyl ester is monoallyl phthalate.

8. The process of making a soluble resinous reaction product which comprises heating glycerol triabietate and diallyl phthalate at between 200° and 300° C.

9. The process of making a soluble resinous reaction product which comprises heating glycerol triabietate and diallyl succinate at between 200° and 300° C.

10. The process of making a soluble resinous reaction product which comprises heating glycerol diabietate and monoallyl phthalate at between 200° and 300° C.

11. A modified rosin ester adapted for use in coating compositions which comprises a heat-reaction product at between 200° and 300° C. of an abietic acid ester and an allyl ester of a saturated polycarboxylic acid miscible therewith.

12. A soluble resinous reaction product which comprises the heat-reaction product at between 200° and 300° C. of a rosin-polyhydric alcohol ester and an allyl ester of a saturated polycarboxylic acid miscible therewith.

13. A soluble resinous composition comprising a reaction product obtained by heating a rosin-polyhydric alcohol ester with an allyl ester of a saturated dicarboxylic acid at between 200° and 300° C.

14. A soluble resinous reaction product obtained by heating a rosin-polyhydric alcohol ester formed from equivalent amounts of rosin acids and polyhydric alcohol, with a diallyl ester of a saturated dicarboxylic acid at between 200° and 300° C.

15. A soluble resinous reaction product obtained by heating a rosin-polyhydric alcohol ester formed from an excess of polyhydric alcohol, with a monoallyl ester of a saturated dicarboxylic acid at between 200° and 300° C.

16. A soluble resinous reaction product obtained by heating rosin glyceride and diallyl phthalate at between 200° and 300° C.

17. A soluble resinous reaction product obtained by heating rosin glyceride and diallyl succinate at between 200° and 300° C.

18. A soluble resinous reaction produce obtained by heating glycerol diabietate and monoallyl phthalate at between 200° and 300° C.

JOHN B. RUST.